United States Patent
Erhart et al.

(10) Patent No.: US 7,519,758 B2
(45) Date of Patent: Apr. 14, 2009

(54) METHOD AND APPARATUS FOR TRANSMITTING MEASUREMENT DATA BETWEEN AN OBJECT DETECTION DEVICE AND AN EVALUATION DEVICE

(75) Inventors: Robert Erhart, Ditzingen (DE); Werner Urban, Vaihingen/Enz (DE); Albrecht Irion, Stuttgart (DE); Dirk John, Renningen (DE); Peter Petschnigg, Stuttgart (DE); Daniel Pindado, Madrid (ES)

(73) Assignee: Robert Bosch GmbH, Stuttgart (DE)

( * ) Notice: Subject to any disclaimer, the term of this patent is extended or adjusted under 35 U.S.C. 154(b) by 140 days.

(21) Appl. No.: 10/505,562

(22) PCT Filed: Oct. 14, 2002

(86) PCT No.: PCT/DE02/03879

§ 371 (c)(1),
(2), (4) Date: May 23, 2005

(87) PCT Pub. No.: WO03/073126

PCT Pub. Date: Sep. 4, 2003

(65) Prior Publication Data

US 2005/0209765 A1 Sep. 22, 2005

(30) Foreign Application Priority Data

Feb. 22, 2002 (DE) ............................. 102 07 579
Mar. 22, 2002 (DE) ............................. 102 12 683

(51) Int. Cl.
*G06F 13/36* (2006.01)
(52) U.S. Cl. ..................... 710/306; 710/64; 710/73; 701/93; 701/96

(58) Field of Classification Search ......... 710/306–311, 710/62–64, 72; 340/345–436; 701/93–96
See application file for complete search history.

(56) References Cited

U.S. PATENT DOCUMENTS

| 5,229,975 A | 7/1993 | Truesdell et al. |
| 5,574,848 A | 11/1996 | Thomson |
| 5,642,467 A * | 6/1997 | Stover et al. ................. 700/250 |
| 5,761,629 A * | 6/1998 | Gilling ......................... 701/96 |

(Continued)

FOREIGN PATENT DOCUMENTS

EP 1103822 5/2001

(Continued)

OTHER PUBLICATIONS

Winner et al., Adaptive Cruise Control System Aspects and Developments Trends, SAE International Congress and Exposition, Detroit, Feb. 26-29, 1996.

*Primary Examiner*—Raymond N Phan
(74) *Attorney, Agent, or Firm*—Kenyon & Kenyon LLP

(57) ABSTRACT

An apparatus and a method for transmitting measurement data between an object-detection device and an evaluation device are provided, the evaluation device sending to the object-detection device one or more data packets with the object identifiers relevant for the evaluation device, the object-detection device inserting the current measurement data of the detected objects into a fixed, predetermined number of data packets, the objects, which the evaluation device with the aid of the object identifiers marked as relevant, being entered preferentially, and the apparatus outputting the data packet to a data bus via the connector element to the data bus.

11 Claims, 2 Drawing Sheets

U.S. PATENT DOCUMENTS

| | | | |
|---|---|---|---|
| 5,764,919 A * | 6/1998 | Hashimoto | 709/236 |
| 5,907,688 A | 5/1999 | Hauck et al. | |
| 6,035,361 A | 3/2000 | Kim et al. | |
| 6,111,888 A | 8/2000 | Hays et al. | |
| 6,161,071 A * | 12/2000 | Shuman et al. | 701/48 |
| 6,161,524 A * | 12/2000 | Akbarian et al. | 123/478 |
| 6,166,628 A * | 12/2000 | Andreas | 340/436 |
| 6,470,257 B1 * | 10/2002 | Seto | 701/96 |
| 6,580,385 B1 * | 6/2003 | Winner et al. | 342/70 |
| 6,727,844 B1 * | 4/2004 | Zimmermann et al. | 342/70 |
| 6,879,969 B2 * | 4/2005 | Engstrom et al. | 706/20 |
| 6,940,448 B2 * | 9/2005 | Knoop et al. | 342/70 |
| 6,968,266 B2 * | 11/2005 | Ahmed-Zaid et al. | 701/96 |
| 6,985,805 B2 * | 1/2006 | Sudou et al. | 701/96 |
| 2001/0035907 A1 | 11/2001 | Broemmelsiek | |
| 2004/0149504 A1 * | 8/2004 | Swoboda et al. | 180/169 |

FOREIGN PATENT DOCUMENTS

| | | |
|---|---|---|
| JP | 6-167565 | 6/1994 |
| JP | 10-221448 | 8/1998 |
| JP | 2000-265563 | 9/2000 |
| JP | 2001-203697 | 7/2001 |
| JP | 2001-346247 | 12/2001 |
| JP | 2002-503841 | 1/2002 |
| JP | 2002218333 | 8/2002 |
| WO | WO 9854872 | 12/1998 |
| WO | 99 42856 | 8/1999 |

* cited by examiner

METHOD AND APPARATUS FOR
TRANSMITTING MEASUREMENT DATA
BETWEEN AN OBJECT DETECTION
DEVICE AND AN EVALUATION DEVICE

FIELD OF THE INVENTION

An apparatus and a method for transmitting measurement data between an object-detection device and an evaluation device are proposed; the evaluation device sending to the object-detection device one or more data packets with the object identifiers relevant for the evaluation device, the object-detection device inserting the current measurement data of the detected objects into a fixed, predetermined number of data packets and the apparatus outputting the data packets to a data bus via the connector element to the data bus.

BACKGROUND INFORMATION

From the publication "Adaptive Cruise Control System Aspects and Developments Trends" by Winner, Witte et al., released at the SAE International Congress and Exposition, Detroit, Feb. 26-29, 1996, an adaptive cruise controller is known which detects preceding vehicles by radar radiation and undertakes a distance control or speed control as a function of the detected objects. It is known from this publication that measurement data regarding detected objects are transmitted from a radar system to an ACC controller, both devices being accommodated in a common housing.

SUMMARY OF THE INVENTION

An object of the present invention is to exchange data between an object-detection device and an evaluation device, the evaluation device transferring to the object-detection device the object identifiers relevant for the evaluation device via one or more data packets. If measured, these identified objects are securely transmitted by the object-detection device during the next cycle. Furthermore it is the subject matter of the present invention that the evaluation device specifies for the object-detection device a distance and/or velocity window and that the object-detection device transmits only the measured object data whose objects lie within this distance and/or velocity window.

Advantageously, the apparatus for sensing objects, which features at least one object-detection device as well as one connector element to a data bus, inserts the current measurement data of the detected objects into the data packet, the object, which the evaluation device selected as the most relevant object, being marked. This marking advantageously occurs by setting a flag, which identifies the object data of the most relevant object, and/or by inputting the data into the data packet in a specified position of the data packet, for example in first position or in final position.

It is furthermore advantageous that the object-detection system includes a transmitting and receiving device for radar radiation and/or that the object-detection system includes a transmitting and receiving device for lidar radiation and/or that the object-detection system includes a receiving device for an image processing system, for example a video camera or a stereo video camera.

Advantageously, the data bus for transmitting the data between the object-sensing apparatus and the apparatus for the further processing of the data is a CAN bus. This bus works especially reliably and can be implemented cost-effectively.

Advantageously, the apparatus according to the present invention is used in a motor vehicle, its use being particularly intended in a device for adaptive cruise control along the lines of a constant-distance control and a constant-speed control. The modular structure of such systems, in which the sensor unit and the control unit may be in separate locations, lends itself to the use of the device according to the present invention.

It is moreover advantageous that the marking of the measurement data of the object, which the evaluation device selected as the most relevant object, is marked. This marking occurs for example by a flag and/or by inputting the object data into the data packet in a specified position. In particular, this specified position may be the first object data position or the final object data position.

It is furthermore advantageous that the object-detection device inserts information into the data packet as to whether in the previous data exchange cycle the evaluation device already identified the particular object as relevant or whether the object is detected for the first time or whether it is a non-relevant object. This may occur for example by setting a dedicated flag.

Moreover it is advantageous that the object-detection device inserts for every detected object an object identifier, with the aid of which the evaluation device as well as the object-detection device can unequivocally identify the object.

It is especially advantageous that the data packets, which are sent by the device featuring at least one device for further processing to the device featuring at least one object-detection system, contain the object identifiers whose measurement data were sent in the previous data exchange cycle by the device featuring the object-detection system to the device featuring the device for further processing and which were rated as relevant by the device for further processing. The device featuring the object-detection system is thereby able to ascertain whether this object is to be rated as relevant and is thus to be transmitted preferentially during the subsequent data exchange cycle. Alternatively, this function may also be implemented in that relevant objects are identified by the object-detection device through a preselection according to one or more criteria and are transmitted preferentially during the subsequent data exchange cycle. Conceivable criteria are e.g. the distance to the sensor, the transverse offset relative to the vehicle axis or the sensor axis and/or the frequency of the detections.

It is furthermore advantageous that the device for further processing of the measurement data specifies for the object-detection device a distance limit and/or a velocity limit or two distance limits and/or velocity limits in the sense of a distance and/or velocity window and that the object-detection device only takes into account the detected objects whose distance to the object-detection device lies below the specified distance limit and/or whose relative velocity in relation to the object-detection system lies below the specified velocity limit or whose distance lies within the specified distance window and/or whose velocity lies within the specified velocity window. The data volume can thereby be reduced in that only the most relevant objects are taken into consideration.

It is furthermore advantageous that the fixed, predetermined number of data packets provides space for measurement data of 8, 16 or 32 objects.

The realization of the method of the present invention in the form of a control element provided for a control unit of an adaptive distance or speed control of a motor vehicle is of particular importance. In this context, a program capable of running on a computer, in particular on a microprocessor, and suitable only for executing the method according to the present invention is stored on the control element. Thus, in this case, the present invention is implemented by a program stored on the control element, so that this control element provided with the program constitutes the present invention in the same manner as does the method for whose execution the program is suitable. In particular, an electric storage medium, e.g. a read only memory, may be used as the control element.

Further features, uses and advantages of the present invention come to light from the following description of exemplary embodiments of the invention which are shown in the figures of the drawing. All the features described or illustrated here, either alone or in any desired combination, constitute the object of the present invention, regardless of their combination in the patent claims or their antecedent, and regardless of how they are formulated in the description or illustrated in the drawings.

DETAILED DESCRIPTION

Figure 1:
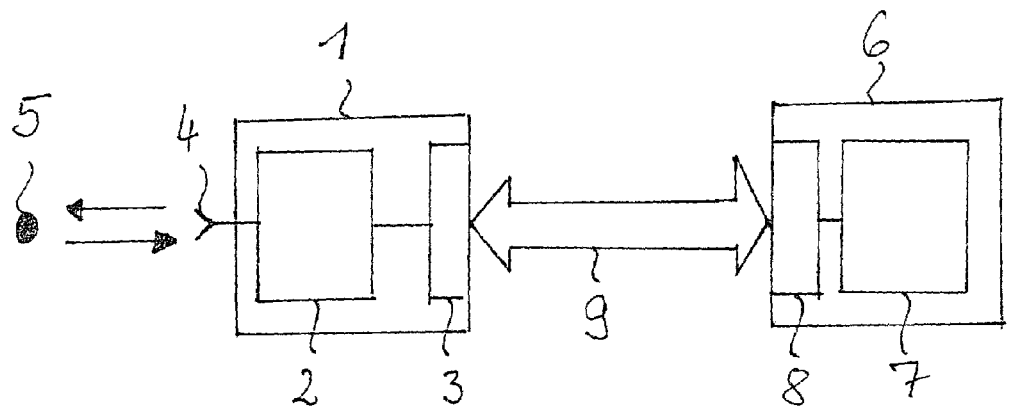
FIG. 1 shows a schematic representation of an apparatus according to the present invention.

FIG. 1 shows the schematic representation of the apparatuses according to the present invention. One can see the object-sensing apparatus 1 featuring at least one object-detection device 2 as well as a connector element to a data bus 3. Object-detection device 2 is connected via the connector element to data bus 3, via which data may be exchanged. Shown furthermore is a transmitting and receiving device 4 that allows the object-detection device 2 to emit radar radiation or lidar radiation which is reflected at a possibly detected object 5 and is received by transmitting and receiving device 4. In the case where object-detection device 2 takes the form of an image capturing device, device 4 is a pure receiving device, since in this case an emission of transmitting signals is not necessary. Object-detection device 2 receives the signals reflected at objects 5 and ascertains as object measurement data at least one of the variables: distance of the object to the object-detection device, speed of the object relative to the object-detection device or absolute speed of the object, acceleration of the object relative to the object-detection device or absolute acceleration of the object, transverse offset of the object relative to the central axis of the object-detection device or transverse speed of the object relative to the central axis of the object-detection device. The variables provided for evaluation, which include at least one of the variables listed, are input by the object-detection device 2 into a fixed, predetermined number of data packets, in which space is provided for a predetermined number of objects with the relevant measured variables. These data packets are transmitted via the connector element to a data bus 3, which may also be a gateway, via data bus 9 to a connector element to a data bus 8, which may also be a gateway, to an apparatus for further processing 6. Apart from the connector element to data bus 8, the apparatus for further processing features at least one device for further processing 7. The measurement data of the received data packet are fed to this device for further processing 7 and are processed for the respectively designated applications.

In accordance with an exemplary embodiment it is conceivable that device for further processing 7 sends back one or more data packets via the connector element to data bus 8, only the object identifiers of the received objects being provided in the relevant data packet(s). This returned packet is received by the connector element to data bus 3 and is passed on to object-detection device 2. There the object identifiers sent by apparatus for further processing 6 are compared to the currently detected objects and are marked as relevant. The measured variables of detected objects 5 are written by object-detection device 2 into the data packet, an entry being made as well as to whether the object is a newly detected object or a non-relevant object and whether it is an object 5 selected as relevant by device for further processing 7, which is marked separately. This marking can occur for example by setting a flag in the data packet's object variable set to be marked or by writing the measured variables in a specially dedicated place of the data packet, for example in the first or last position. The data packets updated in this manner are in turn sent via the connector elements to a data bus 3, 8, and data bus 9 to device for further processing 7, in which the new data are accordingly processed further.

According to a further specific embodiment, via data packets sent to object-detection device 2, device for further processing 7 also specifies, in addition to the identifiers of relevant objects 5, a distance and/or velocity limit, which in the following is also referred to as a D/V window. This D/V window is defined by one or two limit distances and/or one or two limit velocities, which are transmitted to object-detection device 2 with the aid of data packets. Object-detection device 2 subsequently filters detected objects 5 such that only those objects 5 are processed further and are transmitted to device for further processing 7 whose distances to transmitting and receiving element 4 are less than the distance limit specified by device for further processing 7 and/or whose detected velocities are below the velocity limit specified by device for further processing 7 or whose distances lie within the specified distance window and/or whose velocities lie within the specified velocity window. This measure limits the number of detected objects 5 to the range that is of particular interest to device for further processing 7, whereby object-detection device 2 reduces the data volume to be transmitted.

Figure 2:
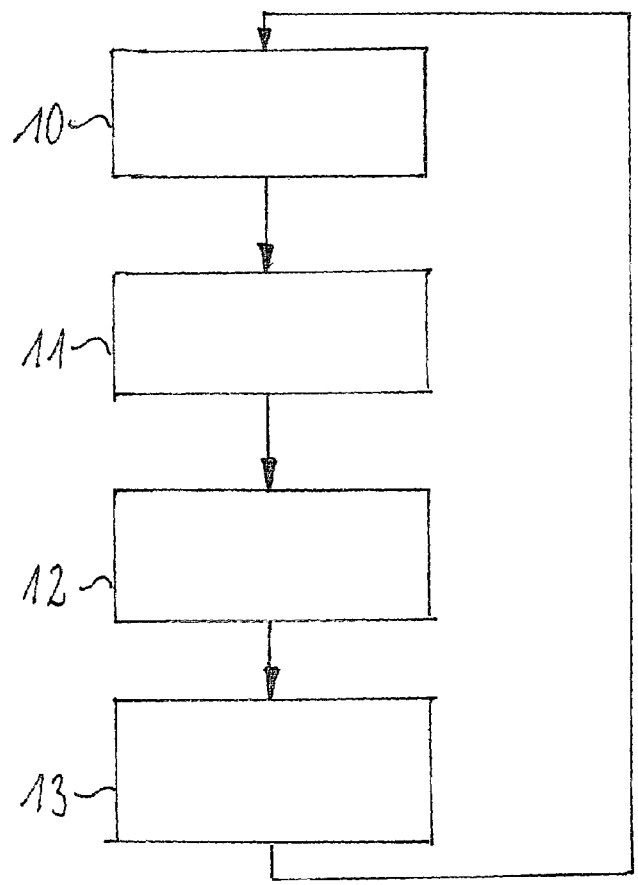
FIG. 2 shows a flowchart representing a variant of the method according to the present invention.

FIG. 2 shows a flowchart of the method according to the present invention. In block 10, apparatus for further processing 6 sends to object-sensing apparatus 1 one or more data packets containing the objects selected as relevant by device for further processing 7. These data packets are transmitted via a connector element to a data bus 8, which may also be a gateway, via a data bus 9, as well as via a connector element to a data bus 3, which may also be a gateway. In a subsequent step, which is represented as block 11, object-detection device 2 enters the measured variables of detected objects 5 into a fixed, predetermined number of data packets, a note being added to the respective object data as to whether it represents a newly detected object or an object that is relevant for the evaluation device. Furthermore, object 5 selected by device for further processing 7 to be the most relevant object may be marked separately, for example by marking the relevant object measurement data with a flag or by writing the object measurement data at a specified position into the data packet. In the subsequent step 12, the fixed, predetermined number of data packets is transmitted by object-detection device 2 to device for further processing 7. In step 13, device for further processing 7 reads the transmitted measurement data from the data packet and, in subsequent step 10, sends one or more data packets containing the object identifiers of the objects relevant for device for further processing 7 back to object-detection device 2. It is also conceivable that the method presented is modified in such a way that the data packet is not continuously sent back and forth between object-sensing apparatus 1 and the apparatus for further processing 6, but that object-detection device 2 continuously generates new data packets, fills these with the measured variables in the manner described and subsequently sends them to device for further processing 7. In this case, a preselection of relevant objects according to one or more criteria is performed in the object-detection device. Conceivable criteria are e.g. the distance to the sensor, transverse offset relative to the vehicle axis or the sensor axis and/or the frequency of the detections.

Figure 3:
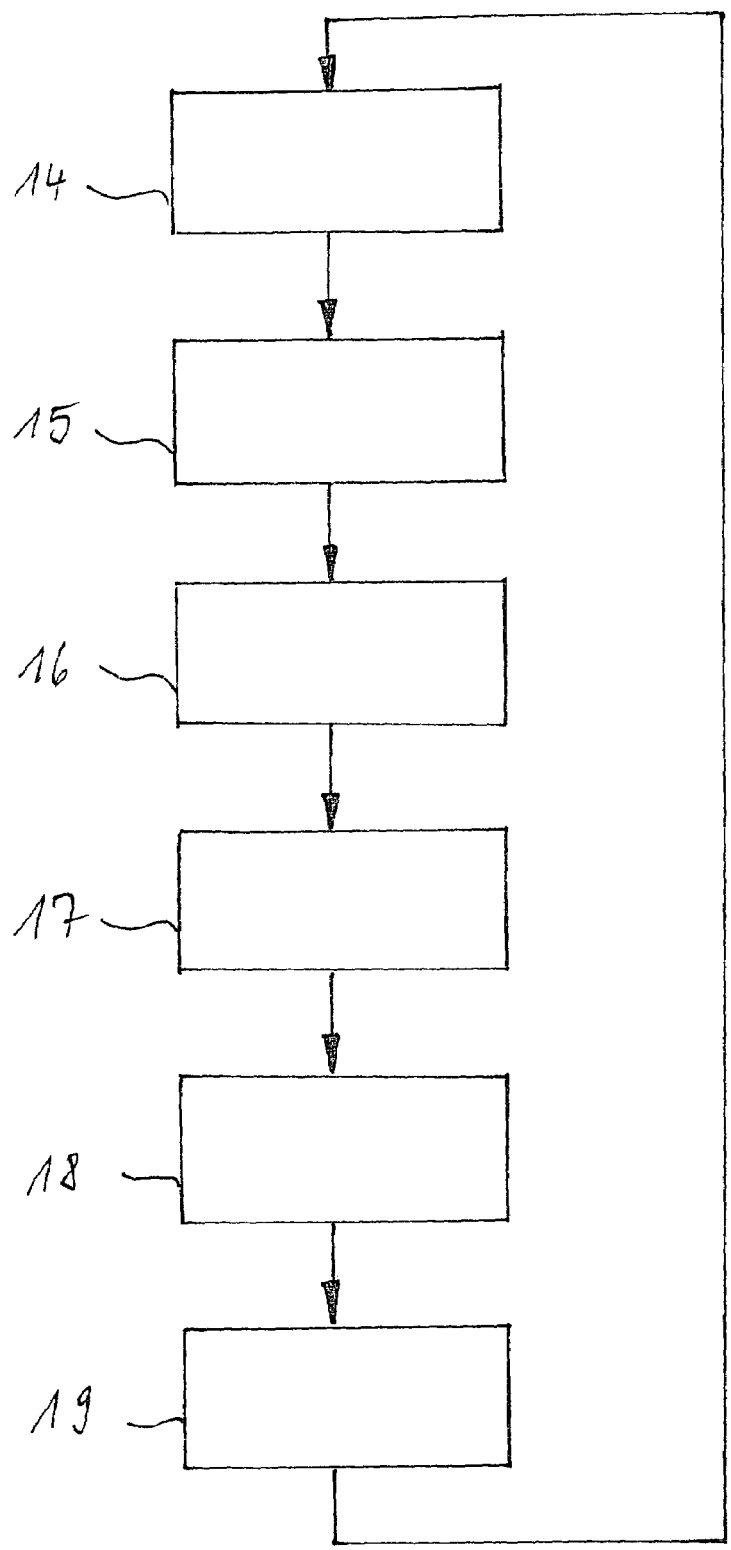
FIG. 3 shows a flowchart representing another specific embodiment of the method according to the present invention.

FIG. 3 shows a further variant of the method described. In block 14, apparatus for further processing 6 sends one or more data packets to object-sensing apparatus 1, these data packets containing the object identifiers of the objects relevant for the evaluation device as well as a D/V window, which is provided as a filter specification for object-detection device 2. In subsequent step 15, object-detection device 2 filters the detected objects according to the criteria of the specified D/V window in that only those objects are processed further whose distance to transmitting and receiving device 4 is less than the specified distance limit value of the D/V window and/or that only those objects are processed further whose measured velocity is lower than the specified velocity limit value of the D/V window or only those objects are processed further whose distance lies within the specified distance window and/or whose measured velocity lies within the specified velocity window. In the following step 16, object-detection device 2 writes the object measurement data of the filtered objects into a fixed, predetermined number of data packets, thereby achieving a restriction to data relevant for the evaluation device. Furthermore, the object data written into the data packets are marked so as to indicate whether they represent a newly detected object or an object that was marked as relevant by the evaluation device in the previous data exchange cycle. Object-detection device 2 obtains this information by comparing the object identifiers transmitted by device for further processing 7 to the current measurement data of detected objects 5. In the subsequent step 17, the data packets are transmitted from object-detection device 2 via the connector elements to a data bus 3 and 8, and via data bus 9 to device for further processing 7. In the following step 18, device for further processing 7 reads out the measurement data of the data packets and processes them within the scope of the specified further processing. In the next step 19, one or more data packets are sent back, which contain the object identifiers of the objects selected as relevant by device for further processing 7 as well as the new distance and/or velocity limit values, which specify the new D/V window. In this exemplary embodiment it is also conceivable that the data packets, which via data bus 9 are sent back and forth between object-sensing apparatus 1 and apparatus for further processing 6, are transmitted only in one direction. To this end, object-detection device 2 in object-sensing apparatus 1 continuously generates new data packets, which are provided with object measurement data, and sends this data packet to device for further processing 7. The object-detection device identifies relevant objects on the basis of a preselection according to one or more criteria and transmits them preferentially in the data exchange cycle. In this case only the new D/V window, which is defined by a distance and/or velocity limit value, is sent in the opposite direction, that is, from apparatus for further processing 6 to object-sensing apparatus 1. Moreover it is also conceivable that a corresponding D/V window is specified for object-sensing apparatus 1 only once and that the distance and/or velocity limit values are permanently stored in object-detection device 2. In this case, the modification and transmission of the new D/V window values from device for further processing 7 to object-detection device 2 does not apply.

What is claimed is:

1. An apparatus for sensing an object and for outputting ascertained object data, comprising:
   at least one object-detection device;
   a connector element for connection to a data bus; and
   an arrangement configured to send, via the connector element, a fixed, predetermined number of data packets provided for transmitting measurement data up to a maximum possible number of detected objects, wherein the arrangement includes:
      an arrangement configured to insert current measurement data of the detected objects into the fixed, predetermined number of data packets;
      an arrangement configured to select and mark a most relevant object; and
      an arrangement configured to output the data packets to the data bus via the connector element.

2. The apparatus as recited in claim 1, wherein:
   the measurement data of the object selected as the most relevant object are marked by one of a flag and inputting object data in a predetermined data packet.

3. The apparatus as recited in claim 1, wherein:
   the apparatus is at least one of a transmitting and receiving device for radar radiation, a transmitting and receiving device for lidar radiation, and a receiving device for an image processing system.

4. The apparatus as recited in claim 1, wherein the apparatus is used in a motor vehicle in a device for adaptive cruise control along the lines of a constant-distance control and a constant-speed control.

5. A method for transmitting measurement data between an object-detection device and an evaluation device, comprising:
   causing the evaluation device to send at least one data packet to the object-detection device;
   causing the object-detection device to insert current measurement data of a detected object into a fixed, predetermined number of data packets;
   marking objects selected as the most relevant objects and entering the marked objects into the fixed, predetermined number of data packets; and
   outputting the data packets to a data bus via a connector element to the data bus.

6. The method as recited in claim 5, wherein the data packets are provided for measurement data of a constant, predetermined number of detected objects.

7. The method as recited in claim 5, wherein:
   the marking includes at least one of using a flag and inputting object data at a specified position of the data packet.

8. The method as recited in claim 5, wherein the object-detection device inserts information into the data packet as to whether the evaluation device already identified the particular object as relevant in a preceding data exchange cycle.

9. The method as recited in claim 5, wherein the data packets contain object identifiers.

10. The method as recited in claim 5, further comprising:
    specifying at least one of a plurality of distance limits and a plurality of velocity limits, wherein:
       the object-detection device only takes into account at least one of the detected objects whose distance to the object-detection device lies within the distance limits and the detected objects whose relative velocity in relation to the object-detection device lies within the velocity limits.

11. The method as recited in claim 5, wherein the data packets are designed for a constant, predetermined number of objects and provide measurement data for 8, 16, or 32 objects.

* * * * *